(12) United States Patent
Moore et al.

(10) Patent No.: US 6,591,892 B1
(45) Date of Patent: Jul. 15, 2003

(54) METHOD AND APPARATUS FOR CASTING COARSE GRAIN SILICONIZED SILICON CARBIDE PARTS

(75) Inventors: Joseph M. Moore, Rochdale, MA (US); Norman I. Paille, Jr., Oxford, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

(21) Appl. No.: 10/292,099

(22) Filed: Nov. 12, 2002

(51) Int. Cl.[7] .............................................. B22D 19/14

(52) U.S. Cl. .................. 164/97; 106/481; 427/431; 164/98

(58) Field of Search ..................... 164/97, 98; 106/481; 427/431

(56) References Cited

U.S. PATENT DOCUMENTS

| | | | | |
|---|---|---|---|---|
| 3,459,566 A | * | 8/1969 | Wilson et al. | ................. 501/90 |
| 4,019,913 A | * | 4/1977 | Weaver et al. | ............... 264/431 |
| 6,503,572 B1 | * | 1/2003 | Waggoner et al. | .......... 427/431 |

* cited by examiner

Primary Examiner—Kuang Y. Lin
(74) Attorney, Agent, or Firm—McCormick, Paulding & Huber LLP

(57) ABSTRACT

A method of casting a siliconized silicon carbide part. The method includes providing a pre-casting mix comprised of a silicon carbide powder having a maximum particle size within a range of about 1000 to 2000 microns, and water having a percentage by weight of no more than about 9.5% of the mix. A slurry is formed from the mix and poured into a mold. The water is then removed from the mold within a predetermined period of time to form a solid porous green part. The green part is surrounded with silicon metal, and heated to a predetermined temperature above the melting point of the silicon metal. The silicon metal then siliconizes the green part to form a siliconized silicon carbide part.

11 Claims, 4 Drawing Sheets

| MATERIAL | % DRY | % WET | PURITY |
|---|---|---|---|
| FIRST SiC POWDER, MAX GRAIN SIZE 15 MICRONS | 40% ± 10% | 37.3629% ± 10% | 97.5% LOWER LIMIT |
| SECOND SiC POWDER, MAX GRAIN SIZE 1400 MICRONS | 60% ± 10% | 56.0444% ± 10% | 98.40% LOWER LIMIT |
| DE-IONIZED WATER | | 6.5385% ± 2% | |
| SODIUM SILICATE DEFLOCCULANT | | 0.058% ± 0.05% | |

FIG. 4

METHOD AND APPARATUS FOR CASTING COARSE GRAIN SILICONIZED SILICON CARBIDE PARTS

FIELD OF THE INVENTION

The present invention relates to casting silicon carbide parts. More specifically, the present invention relates to a method and apparatus for casting coarse grain siliconized silicon carbide parts.

BACKGROUND OF THE INVENTION

Silicon carbide materials are often used in castings to design complex shaped parts that can withstand extreme conditions, such as those found in the semi-conductor, mineral processing, ceramic processing or oil industries. Moreover, it is generally preferred to siliconize a silicon carbide part during the firing process to further enhance the strength of the bonds in the material of the finished product. Siliconized silicon carbide castings are more often preferred over silicon carbide parts due to their increased ability to withstand highly abrasive or harsh chemical environments.

An exemplary casting process for a siliconized silicon carbide part starts with a formulated pre-casting mix typically composed of fine grained silicon carbide powders, distilled water, and dispersing aids or other chemicals. The pre-casting mix is placed into a mill to be tumbled and thoroughly mixed to produce an aqueous slurry. The slurry is then poured into a plaster mold, which removes most of the water and leaves behind a near net shaped green part. The green part is dried and then siliconized at high temperature to densify and strengthen the part. The part is then cooled and may be subjected to a finishing process, such as machining or polishing, to produce the final product.

However, under prior art manufacturing methods, the silicon carbide powders are very fine and present an overall surface area that is capable of adsorbing a lot of water. That is, prior art silicon carbide mixes typically have a maximum particle size of about 250–300 microns, and the particle sizes vary in distribution down to the sub-micron level. In total, the combined particles present a large surface area with which to adsorb water, and therefore require a water content of about 11% to 15% to form a suitable slurry.

Problematically, the more water needed to form a slurry, the more water that must be removed in order to form a solid part in its green state. For cast products with large cross-sectional thicknesses, this process can take time and effort, which can severely slow production rates of the final product. For example, prior art cast siliconized silicon carbide parts having cross-sectional thicknesses of 0.75 inches or more, may require upwards of 24 hours to remove enough water to form a solid green part.

Additionally, the silicon carbide particles must adequately fill up the spaces left behind by the water, or cracks and voids can develop in the finished part. As such the current practical limit of cross-sectional thickness of a siliconized silicon carbide cast part that can be manufactured using prior art methods is about one inch or less.

Unfortunately, the demand for larger and more complex cast siliconized silicon carbide products has outgrown prior art manufacturing capabilities. There is a growing need for cast parts having cross sectional thicknesses greater than 1 inch, and in some cases cross-sectional thicknesses of 8 inches or more are required.

In order to meet the demand for complex shaped parts having larger cross sectional thichnesses, prior art attempts at reducing the water content or increasing the grain size of the silicon carbide in a pre-casting mix have been made. However, formulating a coarser grained pre-casting mix and developing a method of casting the mix has proven to be difficult to do since several factors will affect the final product. Some of these factors include, but are not limited to, the proper combination of grain sizes and distribution, the proper material purity levels, the correct water content and other chemicals used in the mix. Moreover, the adjustment of one factor often has an effect on the other factors to further complicate the problem. Accordingly, finished prior art siliconized silicon carbide cast products with cross sectional widths of 1 inch or greater have yet to be produced consistently without developing an unacceptable number of flaws such as cracks or voids.

Based on the foregoing, it is the general object of the present invention to provide a formulated pre-casting mix and method of producing a siliconized silicon carbide cast product that overcomes the problems and drawbacks associated with the prior art.

SUMMARY OF THE INVENTION

The present invention offers advantages and alternatives over the prior art by providing a pre-casting mix, and a method of efficiently casting siliconized silicon carbide parts from the pre-casting mix, such that cross sectional thicknesses of the cast parts may be greater than 1 inch. The finished cast parts can be manufactured in complex shapes with thicknesses of upwards of 8 inches without an unacceptable number of flaws. Additionally, for most parts having cross sectional thicknesses of approximately ¾ inches to 2 inches, the amount of time required to remove the water from the mold to form a solid green part is no more than 4 hours, as compared to 24 hours or more for prior art methods.

These and other advantages are accomplished in an exemplary embodiment of the invention by providing a method of casting a siliconized silicon carbide part. The method includes providing a pre-casting mix comprised of a silicon carbide powder having a maximum particle size within a range of about 1000 to 2000 microns, and water having a percentage by weight of no more than about 9.5% of the mix. A slurry is formed from the mix and poured into a mold. The water is then removed from the mold within a predetermined period of time to form a solid porous green part. The green part is surrounded with silicon metal, and heated to a predetermined temperature above the melting point of the silicon metal. The silicon metal then siliconizes the green part to form a siliconized silicon carbide part.

In an alternative embodiment of the invention, the method of casting also includes surrounding the green part with carbon. The green part, silicon metal and carbon are then heated to a predetermined temperature above the melting point of silcon metal. At the elevated temperatures, the green part, silicon metal and carbon are reaction bonded together to form a reaction bonded silicon carbide part.

Alternatively, the pre-casting mix may contain the carbon powder. Then the green part (with the carbon powder integrally include therein) and silicon metal are reaction bonded together to form a reaction bonded silicon carbide part.

BRIEF DESCRIPTION OF THE DRAWINGS

FIG. 4 is a preferred embodiment of a pre-casting mix in accordance with the present invention.

DETAILED DESCRIPTION OF THE PREFERRED EMBODIMENTS

Figure 1:
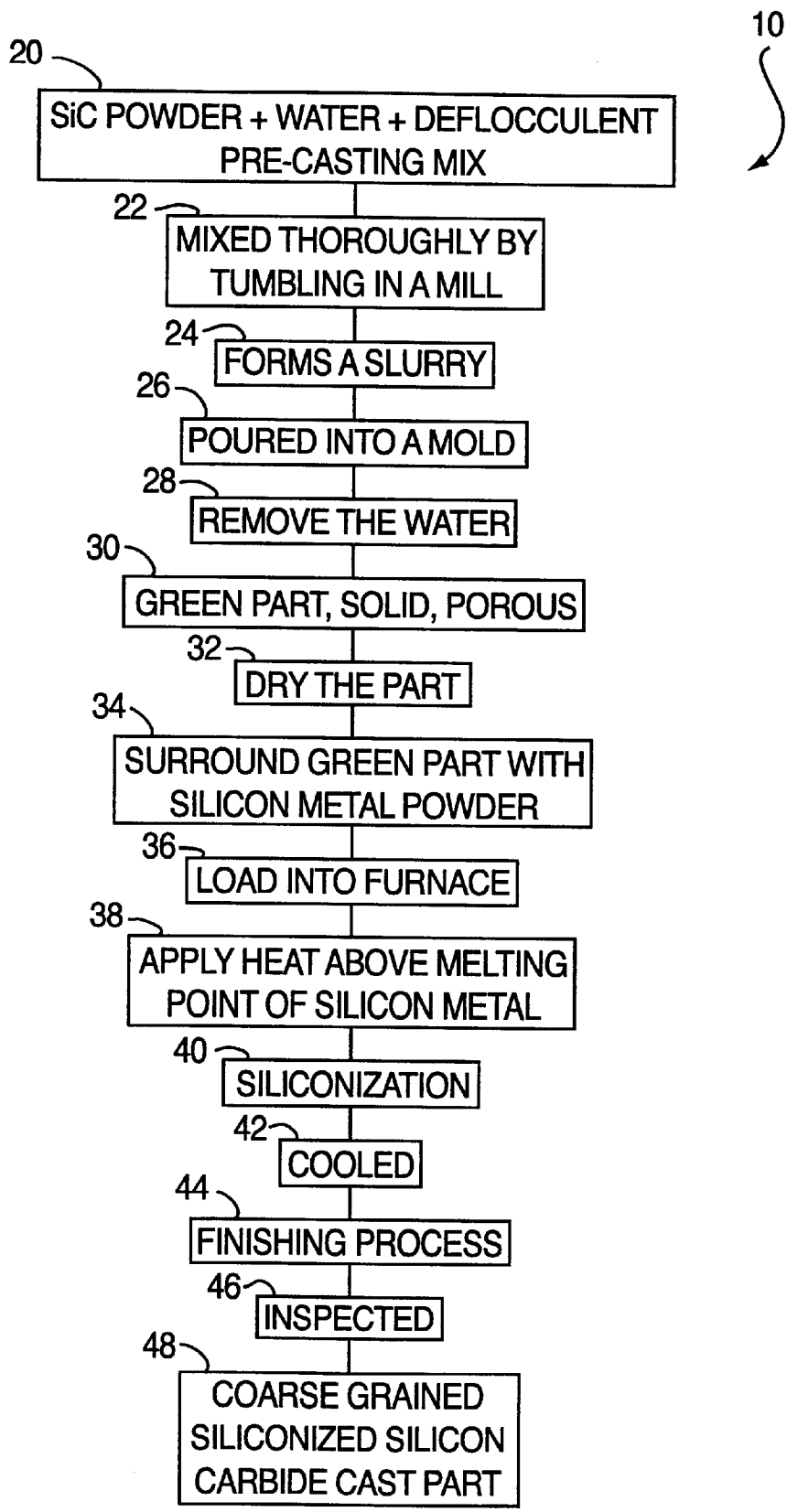
FIG. 1 is an exemplary embodiment of a flow chart for making a siliconized silicon carbide part in accordance with the present invention.

Referring to FIG. 1, a flow chart for making a siliconized silicon carbide part is shown generally at 10. A formulation of silicon carbide (SiC) coarse and fine powders is combined with de-ionized water to form a pre-casting mix 20. The coarse silicon carbide powder having a maximum grain (or particle) size within a range of about 1000 microns to 2000 microns, and preferable not more than about 1500 microns.

The powders are generally manufactured by putting raw silicon carbide material through a sieve device having a predetermined maximum mesh or perforation size, to separate finer particles from coarser particles. As such the sized distribution of the particles in the powder vary generally continuously from the maximum particle size down to the sub-micron level. Additionally, as will be discussed in greater detail herein below, there may be more than one powder having more than one maximum particle size and size distribution range incorporated into the mix.

The above coarse powders in the pre-casting mix have a much coarser maximum and average grain size as compared to the prior art fine powders, which typically have maximum grain sizes of 250 to 300 microns. Accordingly, for any given volume, the total surface area of the particles in the coarse powder is much less than the total surface area of the fine powder, and can therefore absorb less water. Typically, the amount of water required for the coarse grained mix is no more than about 9.5% by weight, and preferable within a range of about 4.5% to 8.5% by weight.

Once the pre-casting mix 20 has been formed, it is put into a mill 22 and mixed thoroughly by tumbling to form a slurry 24. The slurry 24 is a suspension of the insoluble matter, i.e., the silicon powders, in water that generally has the consistency of mud or clay.

Once the slurry 24 is formed, the material is removed from the mill and poured into a plaster mold. Most of the water 28 is then removed from the mold 26 to form a solid near net shaped green part 30.

At the end of the casting process, the near net shape green part 30 typically has a density of between 60 to 90% of its theoretical density, and is fairly porous. Advantageously, due in large part to the proper grain size distribution and water content of the pre-casting mix, substantially all of the space occupied by the water in the mold is replaced by solid material without an unacceptable amount of flaws developing in the green part.

The green part is than dried 32, and covered with silicon metal powder 34. Though this step disclosed the use of a silicon metal powder, other physical configurations of silicon metal may be utilized to surround the green part, i.e., the green body may be enclosed in a silicon metal container.

The green part and surrounding silicon powder are then loaded into a furnace 36, e.g., such as an induction furnace. The part is then heated above the melting point of the silicon metal 38, typically between 1500 to 2200 degrees centigrade, to siliconize and densify the part 40.

Siliconized silicon carbide is also called silicon infiltrated silicon carbide because siliconization is a form of infiltration. Infiltration may be described as any technique of filling in pores by reaction with or deposition from a liquid or vapor. In the case of liquid reaction, the technique is called melt infiltration; in the case of vapor phases, it is called chemical vapor infiltration, or CVI.

In the present case, because the green body is not fully dense, or it has pores, the silicon metal will melt infiltrate into the pores to create a matrix surrounding the silicon carbide crystals of the green body. The process produces a fully dense structure with essentially zero porosity.

Once siliconization is complete, the part is then cooled 42 and may be subjected to a finishing process 44, such as a final machining of critical dimensions. The part is then inspected 46 to produce the finished coarse grained siliconized silicon carbide cast product 48.

The above method of casting enables the efficient production of siliconized silicon carbide cast parts with cross sectional thicknesses of 1 inch or greater, and in some cases upwards of 8 inches. Additionally, the amount of time to remove water from the mold to form a solid green part is greatly reduced. For example, most parts having cross-sectional thicknesses of approximately ¾ inches to 2 inches require less than 4.0 hours to remove an adequate amount of water utilizing the above method, as compared to 24 hours or more with prior art casting methods.

Figure 2:
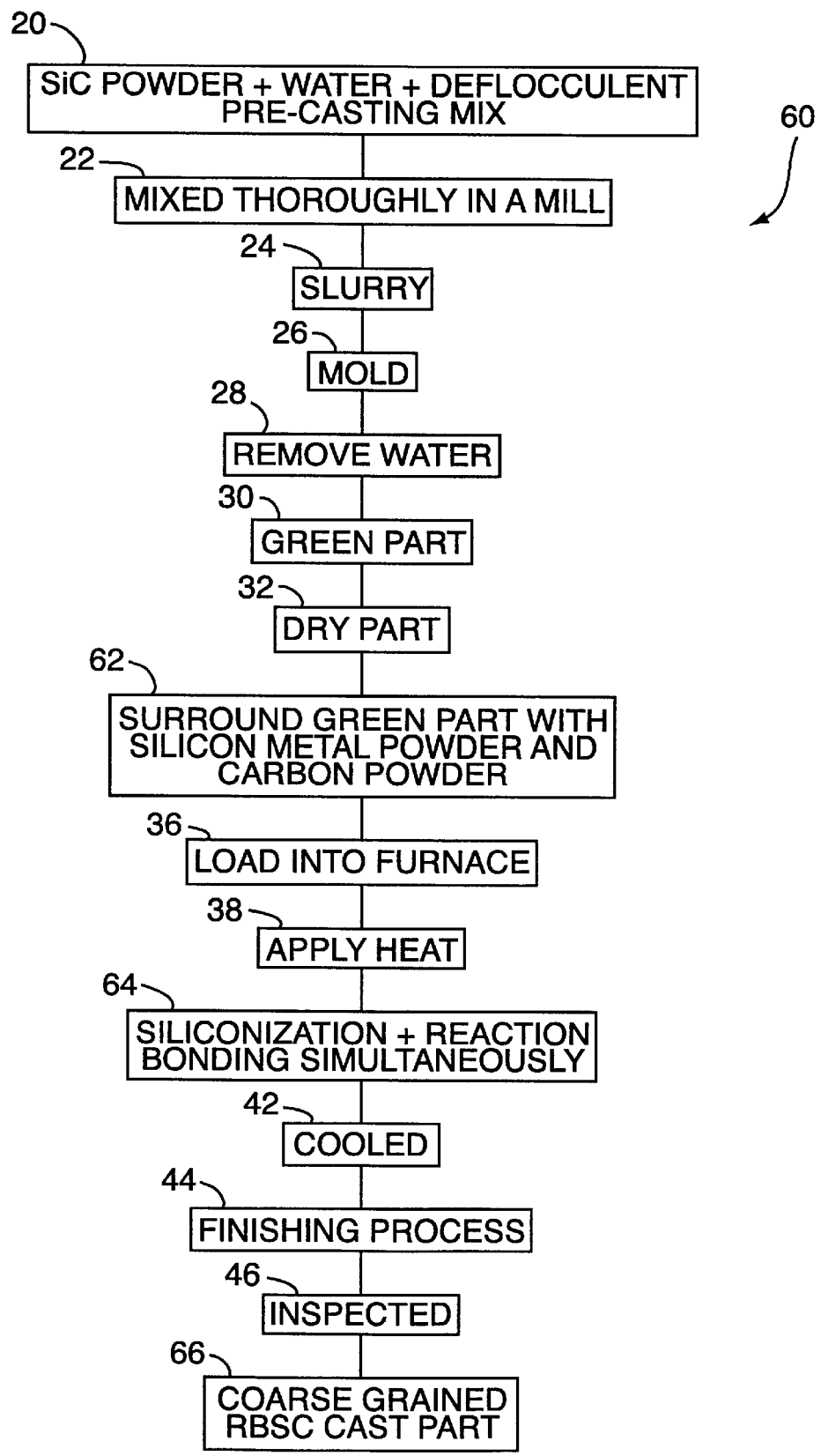
FIG. 2 is an exemplary embodiment of a flow chart for making a reaction-bonded silicon carbide part in accordance with the present invention.

Referring to FIG. 2, a typical manufacturing process flow chart of a reaction-bonded silicon carbide part in accordance with the present invention is shown generally at 60. Reaction-bonded silicon carbide (RBSC) parts are produced from a finely divided, intimate mixture of silicon carbide and carbon, and are both siliconized and reaction bonded simultaneously. Pieces formed from this mixture are exposed to liquid or vapor silicon at high temperature. The silicon reacts with the carbon to form additional silicon carbide, which bonds the original particles together. Silicon also fills any residual open pores, i.e., siliconization. RBSC parts undergo little dimensional change during densification. RBSC products exhibit virtually constant strength as temperatures rise to the melting point of silicon. One such preferred form of RBSC material, which can be manufactured in accordance with the present invention, is available from Saint-Gobain Ceramics & Plastics, Inc., of Worcester, Mass., under the trade name CRYSTAR® RB.

In FIG. 2, the exemplary method of forming a coarse grain RBSC is similar to the method of forming a coarse grained siliconized silicon carbide shown in FIG. 1. Therefore, those steps that are substantially the same as the steps performed in FIG. 1 are illustrated with the same reference numbers.

Accordingly, steps 20–32 are essentially the same wherein, a formulation of silicon carbide (SiC) coarse powders is combined with de-ionized water to form a pre-casting mix 20. The coarse silicon carbide powder has a maximum grain size within a range of about 1000 microns to 2000 microns, and preferable not more than about 1500 microns. The amount of water required for the coarse grained mix is typically not more than about 9.5% by weight, and preferable within a range of about 4.5% to 8.5% by weight.

Once the pre-casting mix 20 has been formed, it is put into a mill 22 and mixed thoroughly by tumbling to form a slurry 24, which is poured into a plaster mold 26. The water is removed from the mold 28 to form a near net shaped green part 30, which is then dried 32.

The green part is then covered with a mixture of silicon metal powder and carbon powder 62. The green part and surrounding silicon powder and carbon powder are then loaded into a furnace 36. The part is then heated above the melting point of the silicon metal 38, typically between 1500 to 2200 degrees centigrade, to siliconize and reaction bond the part 64.

In step 64, some of the silicon reacts with the carbon to form additional silicon carbide, which bonds with the original particles of the green part, i.e., reaction bonding. Simultaneously, the remaining silicon fills any residual open pores to densify and form a matrix of silicon metal around the silicon carbide structure of the green part, i.e., siliconization.

Once reaction bonding and siliconization is complete, the part is then cooled 42 and subjected to a finishing process 44. The part is then inspected 46 to produce the finished coarse grained RBSC cast product 66.

Advantageously, the combination of the enhanced bond strength from the reaction bonding, and the larger size of the coarse grains, produces several desirable features in the finished product 66. One such feature is an increased abrasion resistance. In some cases, the wear resistance of the coarse grained RBSC may be as much as 25% greater than the wear resistance of finer grained RBSC. Moreover, the RBSC products have nearly constant bond strength for temperatures up to the melting point of silicon.

Figure 3:
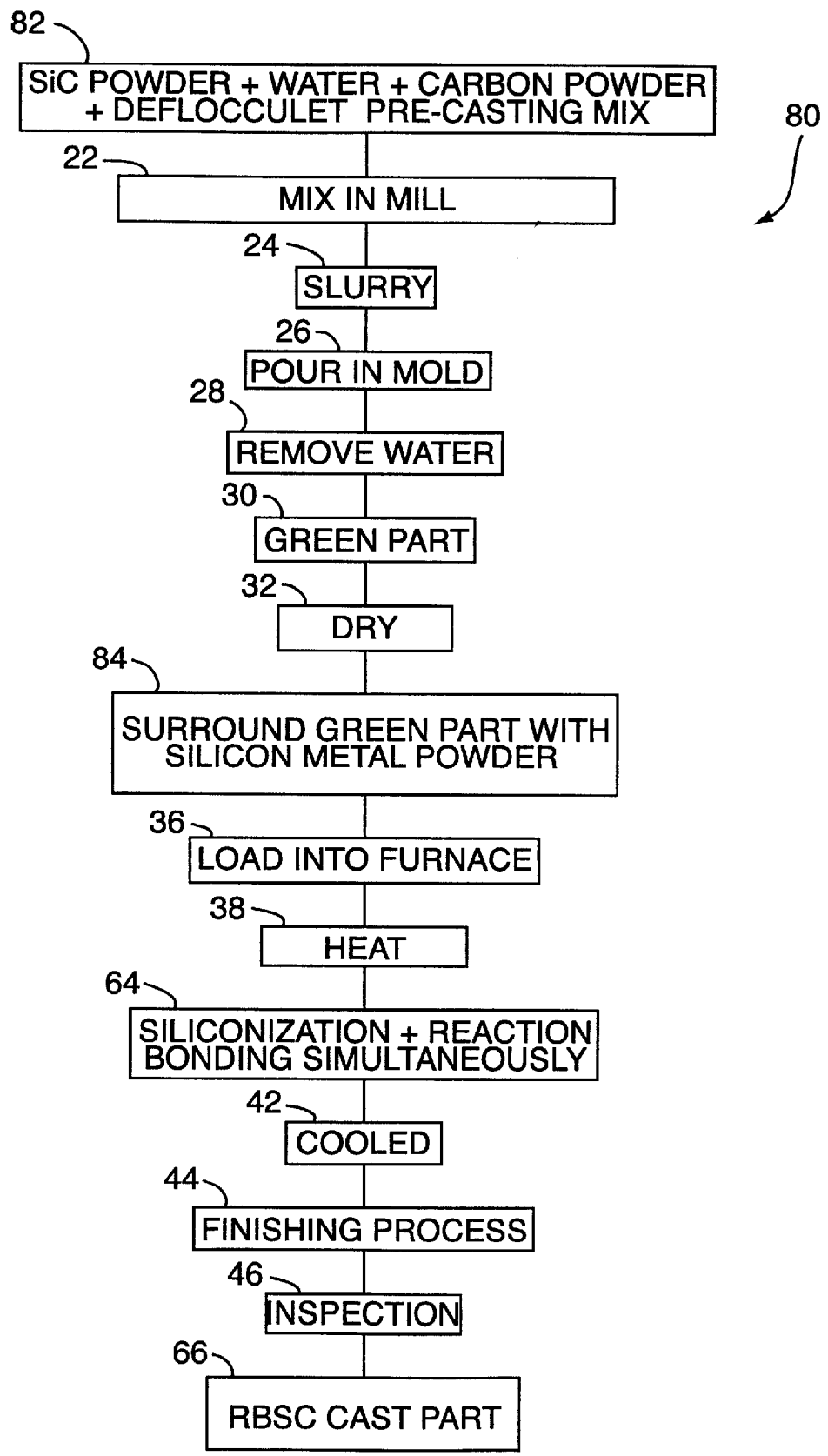
FIG. 3 is and alternative exemplary embodiment of a flow chart for making the reaction-bonded silicon carbide part.

Referring to FIG. 3, and alternative embodiment of a method of manufacturing coarse grained RBSC parts is shown generally at 80. The process is virtually identical to the process illustrated in FIG. 2, except that the carbon powder is mixed into the pre-casting mix at step 82. In this exemplary method, the green part 30 is surrounded with silicon metal powder only at step 84, since the additional carbon has already been incorporated into the green part. The finished coarse grain RBSC part is the same.

Referring to FIG. 4, a preferred embodiment of a pre-casting mix is illustrated in table form at 100. The pre-casting mix 100 includes two types of silicon carbide powders 102 and 104, having two grain size distributions respectively. The first silicon carbide powder 102 represents substantially 37.36% plus or minus 10% of the mix 100 by weight, and has a maximum grain size of no more than about 15 microns. The purity of the first powder 102 ranges essentially from 97.5% to 100%. The second silicon carbide powder 104 represents substantially 56.04% plus or minus 10% of the mix 100 by weight, and has a maximum grain size of no more than about 1400. The purity of the second powder 104 ranges from about 98.40% to 100%

De-ionized water 106 is included in the mix in the range of about 6.54% by weight, plus or minus 2.0%. Also a deflocculent or dispersion agent 108, such as sodium silicate, is used to help prevent the coagulation or coalescence of the silicon carbide particles in the slurry. The deflocculent 108 represents about 0.058% plus or minus 0.05% by weight of the mix 100.

The above mix is sometimes described in terms of its dry powder components only. That is the total amount silicon carbide powder of the mix can be said to include the first 102 and second 104 powders as components. The first powder 102 representing about 40% plus or minus 10% by weight of the total powder, the second powder 104 representing about 60% plus or minus 10% by weight of the total powder, and the combination of the first and second powders representing substantially 100% of the total silicon carbide powder in the mix.

The above pre-casting mix 100, when used in the previously described exemplary methods illustrated in flow charts 10, 60 and 80, has efficiently enabled the manufacture of complex siliconized silicon carbide parts with large cross sectional widths. Examples of such complex shaped parts would include miconizers or cones for the mineral processing industry, screw conveyors for the food processing industry, and venturi or nozzles for the aircraft industry.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method of casting a siliconized silicon carbide part comprising: providing a pre-casting mix comprising:
   a silicon carbide powder having a maximum particle size within a range of about 1000 to 2000 microns, and
   water having a percentage by weight of no more than about 9.5% of the mix;
   forming a slurry from the mix;
   pouring the slurry into a mold;
   removing the water from the mold within a predetermined period of time to form a solid porous green part;
   surrounding the green part with silicon metal;
   heating the green part and silicon metal to a predetermined temperature above the melting point of the silicon metal; and
   siliconizing the green part to form a siliconized silicon carbide part.

2. The method of claim 1 comprising:
   surrounding the green part with carbon;
   heating the green part, silicon metal and carbon to a predetermined temperature above the melting point of silicon metal; and
   reaction bonding the green part, silicon metal and carbon to form a reaction bonded silicon carbide part.

3. The method of claim 1 comprising:
   the pre-casting mix further comprising a carbon powder; and
   reaction bonding the green part with the carbon powder integrally included therein and silicon metal to form a reaction bonded silicon carbide part.

4. The method of claim 1 comprising forming a siliconized silicon carbide part having a cross sectional thickness of greater than 1.0 inch.

5. The method of claim 1 comprising:
   removing the water from the mold within about 4 hours or less to form a solid porous green part; and
   forming a siliconized silicon carbide part having a cross sectional thickness of approximately ¾ inches to 2 inches.

6. The method of claim 1 comprising heating the green part and silicon metal within a range of 1500 to 2200 degrees centigrade.

7. The method of claim 1 wherein the silicon carbide powder within the mix has a maximum particle size of no more than about 1500 microns.

8. The method of claim 1 wherein the silicon carbide powder within the mix comprises:
   a first silicon carbide powder having a maximum particle size of no more than about 15 microns, and being about 40% plus or minus 10% of the total amount of silicon carbide powder by weight; and
   a second silicon carbide powder having a maximum particle size of no more than about 1400 microns, and being about 60% plus or minus 10% of the total amount of silicon carbide powder by weight;

wherein the first and second silicon carbide powders combined are about 100% of the total amount of silicon carbide powder by weight.

9. The method of claim 1 wherein the pre-casting mix comprises:

a first silicon carbide powder having a maximum particle size of no more than about 15 microns, and being about 37.36% plus or minus 10% of the total amount of mix by weight;

a second silicon carbide powder having a maximum particle size of no more than about 1400 microns, and being about 56.04% plus or minus 10% of the total amount of mix by weight; and water being about 6.54% plus or minus 2% of the total amount of mix by weight.

10. The method of claim 9 wherein the pre-casting mix comprises a deflocculent being about 0.058% plus or minus 0.05% of the total amount of mix by weight.

11. The method of claim 10 wherein the deflocculent is sodium silicate.

* * * * *